United States Patent
Walker

(10) Patent No.: US 8,599,971 B2
(45) Date of Patent: Dec. 3, 2013

(54) COMMUNICATION SYSTEM UTILIZING A HIERARCHICALLY MODULATED SIGNAL AND METHOD THEREOF

(71) Applicant: Delphi Technologies, Inc., Troy, MI (US)

(72) Inventor: Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/705,527

(22) Filed: Dec. 5, 2012

(65) Prior Publication Data

US 2013/0094618 A1    Apr. 18, 2013

Related U.S. Application Data

(62) Division of application No. 12/721,010, filed on Mar. 10, 2010, now Pat. No. 8,379,769.

(51) Int. Cl.
*H03D 1/00* (2006.01)
*H04L 12/28* (2006.01)
*H04W 4/00* (2009.01)

(52) U.S. Cl.
USPC ............................. 375/341; 370/401; 370/338

(58) Field of Classification Search
USPC .................................... 375/341; 370/401, 338
See application file for complete search history.

(56) References Cited

U.S. PATENT DOCUMENTS

| | | |
|---|---|---|
| 5,315,584 A | 5/1994 | Savary et al. |
| 5,646,935 A | 7/1997 | Ishalawa et al. |
| 5,687,166 A | 11/1997 | Natali et al. |
| 5,966,412 A | 10/1999 | Ramaswamy |
| 5,987,068 A | 11/1999 | Cassia et al. |
| 6,118,827 A | 9/2000 | Wynn |

(Continued)

FOREIGN PATENT DOCUMENTS

| | | |
|---|---|---|
| EP | 0594505 | 10/1993 |
| EP | 1011245 | 6/2000 |

(Continued)

OTHER PUBLICATIONS

Jacques Meyer, Chief Architect, Consumer and Micro Group Set Top Box Division STMicroelectronic Inc., "High Efficiency Modulations for Satellite TV," May 2003.

(Continued)

*Primary Examiner* — Leon-Viet Nguyen
*Assistant Examiner* — Sarah Hassan
(74) *Attorney, Agent, or Firm* — Lawrence D. Hazelton

(57) ABSTRACT

A communication system utilizing a hierarchically modulated signal and method thereof are provided, wherein a receiver system is configured to receive a hierarchically modulated signal. The receiver system includes a receiver device configured to receive the hierarchically modulated signal, which is a function of a time domain, and including a high priority data stream that has a single carrier type modulation, and a low priority data stream having data bits that are spread over a plurality of data symbols of a high priority data modulation. The receiver system further includes a low priority processor device, which includes an OFDM decoder configured to convert the low priority data stream of the hierarchically modulated signal that is a function of the time domain to be a function of a frequency domain by utilizing a FFT, such that an output is emitted that is representative of the low priority data stream.

8 Claims, 5 Drawing Sheets

(56) References Cited

U.S. PATENT DOCUMENTS

| | | | |
|---|---|---|---|
| 6,119,827 A | 9/2000 | Militello et al. | |
| 6,359,938 B1* | 3/2002 | Keevill et al. | 375/316 |
| 6,480,522 B1* | 11/2002 | Hoole et al. | 375/130 |
| 6,510,317 B1 | 1/2003 | Marko et al. | |
| 6,549,563 B1 | 4/2003 | McDonough | |
| 6,570,858 B1 | 5/2003 | Emmons, Jr. et al. | |
| 6,621,851 B1* | 9/2003 | Agee et al. | 375/130 |
| 6,704,317 B1* | 3/2004 | Dobson | 370/401 |
| 7,190,729 B2 | 3/2007 | Siwaiak | |
| 7,440,392 B2 | 10/2008 | Hwang et al. | |
| 7,657,225 B2 | 2/2010 | Walker et al. | |
| 2002/0088005 A1* | 7/2002 | Wu et al. | 725/129 |
| 2002/0186797 A1* | 12/2002 | Robinson | 375/341 |
| 2003/0060173 A1 | 3/2003 | Lee et al. | |
| 2003/0087673 A1* | 5/2003 | Walton et al. | 455/562 |
| 2004/0028076 A1 | 2/2004 | Strolle et al. | |
| 2005/0005120 A1 | 1/2005 | Kahn et al. | |
| 2005/0089068 A1 | 4/2005 | Sun et al. | |
| 2005/0113040 A1 | 5/2005 | Walker et al. | |
| 2005/0243954 A1* | 11/2005 | Li | 375/347 |
| 2006/0050805 A1 | 3/2006 | Chen et al. | |
| 2006/0088010 A1* | 4/2006 | Buchwald et al. | 370/338 |
| 2006/0171181 A1 | 8/2006 | Clavel | |
| 2006/0183287 A1* | 8/2006 | Collins et al. | 438/278 |
| 2006/0232447 A1 | 10/2006 | Walker et al. | |
| 2007/0054614 A1 | 3/2007 | Walker et al. | |
| 2008/0115007 A1 | 5/2008 | Jalali | |

FOREIGN PATENT DOCUMENTS

| | | |
|---|---|---|
| EP | 1065854 | 1/2001 |
| WO | 0139456 | 5/2001 |
| WO | 0217615 | 2/2002 |
| WO | 03/024048 | 3/2003 |
| WO | 2004/100479 | 11/2004 |

OTHER PUBLICATIONS

Pursley et al., "Adaptive Nonuniform Phase-Shift-Key Modulation for Multimedia Traffic in Wireless Networks," IEEE Journal on Selected Areas in Communications, vol. 18, No. 8, Aug. 2000, pp. 1394-1407.

Vitthaladevuni et al., "Effect on Imperfect Phase and Timing Synchronization on the Error Rate Performance of PSK Modulations," IEEE, Mar. 2002, pp. 356-360.

Hossain et al; "Hierarchical Modulations for Multimedia and Multicast Transmission over Fading Channels," IEEE, Mar. 2003, pp. 2633-2637.

Pursly et al; "Nonuniform Phase-Shift-Key Modulation for Multimedia Multicast Transmission in Mobile Wireless Networks," IEEE Journal on Selected Areas in Communications, vol. 17, No. 5, May 1999, pp. 774-783.

Schertz and Weck, "Hierarchical Modulation—The Transmission of two Independent DVB-T Multiplexes on a Single Frequency," EBU Technical Review, Apr. 2003, pp. 1-13.

DVB Digital Video Broadcasting; DVB, MHP, the DVB logo and the MHP logo are registered trademarks of Digital Video Broadcasting Project, 2005.

Vitthaladevuni et al., "Exact BER Computation of Generalized Hierarchical PSK Constellations," IEEE, Feb. 2002, pp. 1974-1978.

J. Sesna; The DVB satellite, cable and SMATV systems, EBU Technical Review, Winter 1995, pp. 24-38.

Tanner, UBS Looks Southward, USB, a Canadian Developer of MMDS Equipment Eyes on the U.S., Aug. 2001, www.shorecliffcommunications.com, Broadband Online, pp. 1-6.

Yoshida; New DVB satellite modulation scheme drops Turbo; Mar. 7, 2003, EETIMESUK, www.electronicstimes.com, p. 1.

* cited by examiner

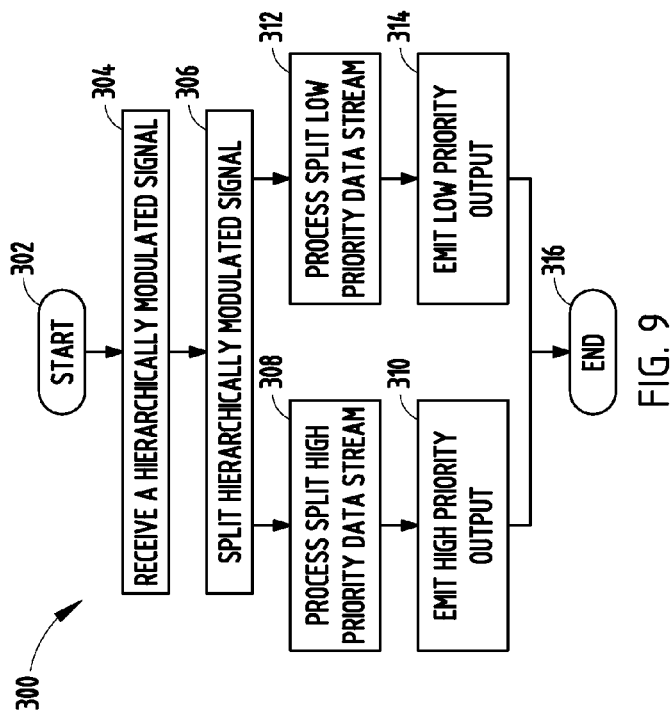
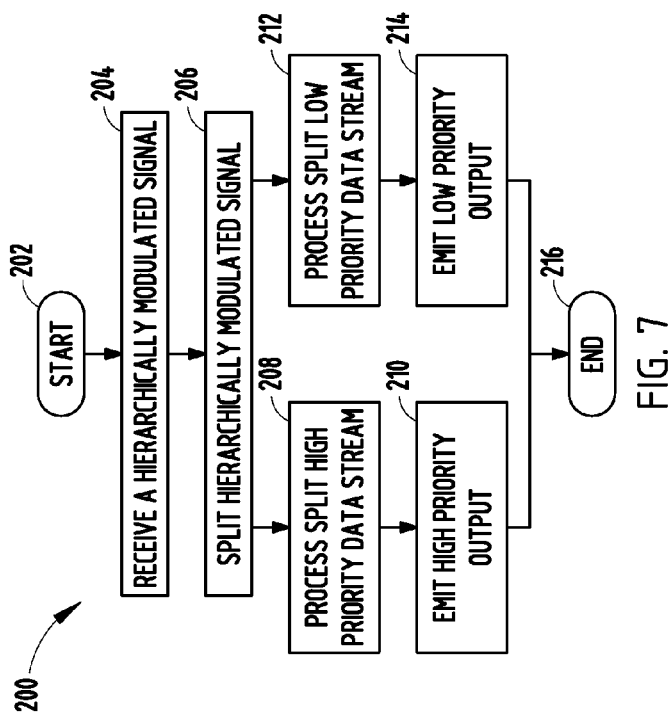
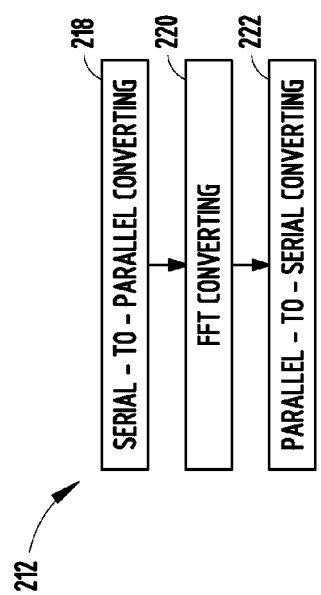

COMMUNICATION SYSTEM UTILIZING A HIERARCHICALLY MODULATED SIGNAL AND METHOD THEREOF

CROSS-REFERENCE TO RELATED APPLICATION

This application is a divisional application and claims the benefit under 35 U.S.C. §121 of U.S. patent application Ser. No. 12/721,010 filed Mar. 10, 2010, the entire disclosure of which is hereby incorporated herein by reference.

FIELD OF THE INVENTION

The present invention generally relates to a communication system, and more particularly, a satellite communication system utilizing a hierarchically modulated signal.

BACKGROUND OF THE INVENTION

In October of 1997, the Federal Communications Commission (FCC) granted two national satellite radio broadcast licenses. In doing so, the FCC allocated twenty-five (25) megahertz (MHz) of the electromagnetic spectrum for satellite digital broadcasting, at which time twelve and one-half (12.5) MHz was owned by XM Satellite Radio, Inc. of Washington, D.C. and 12.5 MHz was owned by Sirius Satellite Radio, Inc. of New York City, N.Y. In 2007, both companies merged to form SiriusXM Radio of New York City, N.Y. and provide subscription-based digital audio that is transmitted from two different sets of communication satellites (XM and Sirius), and the services provided by these and other SDAR companies are capable of being transmitted to both mobile and fixed receivers on the ground.

Generally, in the XM satellite system, two (2) communication satellites were present in a geostationary orbit, wherein one satellite was positioned at longitude one hundred fifteen degrees (115) degrees (west), and the other at longitude eighty-five (85) degrees (east). Accordingly, the satellites were always positioned above the same spot on the earth. In the Sirius satellite system, however, three (3) communication satellites were present, which all traveled on the same orbital path, spaced approximately eight (8) hours from each other. Consequently, two (2) of the three (3) satellites were "visible" to receivers in the United States at all times. Since both satellite systems generally had difficulty providing data to mobile receivers in urban canyons and other high population density areas with limited line-of-sight satellite coverage, both systems utilized terrestrial repeaters as gap fillers to receive and re-broadcast the same data that was transmitted in the respective satellite systems.

In order to improve satellite coverage reliability and performance, SDAR systems generally use three (3) techniques that represent different kinds of redundancy known as diversity. The techniques include spatial diversity, time diversity, and frequency diversity. Spatial diversity refers to the use of two (2) satellites transmitting near-identical data from two (2) widely-spaced locations. Time diversity is implemented by introducing a time delay between otherwise identical data, and frequency diversity includes the transmission of data in different frequency bands. SDAR systems may utilize one (1), two (2), or all of the above-noted techniques.

SUMMARY OF THE INVENTION

According to one aspect of the present invention, a receiver system configured to receive a hierarchically modulated signal from a transmitter system is provided that includes a receiver device configured to receive the hierarchically modulated signal, the hierarchically modulated signal being a function of a time domain, and including a high priority data stream that has a single carrier type modulation, and a low priority data stream, wherein data bits of the low priority data stream are spread over a plurality of data symbols of a high priority data modulation, and a high priority processor device in communication with the receiver device, wherein the high priority processor device is configured to process the high priority data stream of the received hierarchically modulated signal, such that an output is emitted that is representative of the high priority data stream. The receiver system further includes a low priority processor device in communication with the receiver device, wherein the low priority processor device is configured to process the low priority data stream of the received hierarchically modulated signal, the low priority processor device including an orthogonal frequency-division multiplexing (OFDM) decoder in communication with the receiver device, wherein the OFDM decoder is configured to convert the low priority data stream of the received hierarchically modulated signal that is a function of the time domain to be a function of a frequency domain by utilizing a fast Fourier transform (FFT), such that an output is emitted that is representative of the low priority data stream.

According to another aspect of the present invention, a method of receiving a hierarchically modulated signal includes the steps of receiving the hierarchically modulated signal, the hierarchically modulated signal being a function of a time domain, and including a high priority data stream that has a single carrier type modulation, and a low priority data stream, wherein data bits of the low priority data stream are spread over a plurality of data symbols of a high priority data modulation, splitting the received hierarchically modulated signal as a function of the high priority data stream and the low priority data stream, processing the split high priority data stream, emitting an output that is representative of the processed high priority data stream, processing the split low priority data stream, which includes converting the low priority data stream of the received hierarchically modulated signal that is a function of the time domain to be a function of a frequency domain by utilizing a fast Fourier transform (FFT), and emitting an output that is representative of the processed low priority data stream.

According to yet another aspect of the present invention a receiver system configured to receive a hierarchically modulated signal from a transmitter system is provided that includes a receiver device configured to receive the hierarchically modulated signal that includes a high priority data stream and a low priority data stream, a high priority processor device in communication with the receiver device, wherein the high priority processor device is configured to process the high priority data stream of the received hierarchically modulated signal, such that an output is emitted that is representative of the high priority data stream, and a low priority processor device in communication with the receiver device, wherein the low priority processor device is configured to process the low priority data stream of the received hierarchically modulated signal. The low priority processor device includes a variable despreader device in communication with the receiver device, wherein the variable despreader device is configured to reconstruct transmitted bits of the hierarchically modulated data stream by integrating received symbols over a variable integration time period corresponding to each transmitted bit, the variable integration time period being known by the transmitter system and the low priority processor device, and each symbol having a corresponding variable integration time period, such that an output is emitted that is representative of the low priority data stream.

According to yet another aspect of the present invention, a method of receiving a hierarchically modulated signal from a transmitter system includes the steps of receiving the hierarchically modulated signal that includes a high priority data stream and a low priority data stream, splitting the received hierarchically modulated signal as a function of the high priority data stream and the low priority data stream, processing the split high priority data stream, emitting an output that is representative of the processed high priority data stream, processing the split low priority data stream, which includes variably despreading to reconstruct transmitted bits of the received hierarchically modulated data stream by integrating received symbols over a variable integration time period corresponding to each transmitted bit, the variable integration time period being known by the transmitter system and a low priority processing device configured to process the split low priority data stream, and each symbol having a corresponding variable integration time period, and emitting an output that is representative of the processed low priority data stream.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 7 is a flowchart illustrating a method of receiving a hierarchically modulated signal, in accordance with one embodiment of the present invention;

FIG. 8 is a flowchart illustrating a method of step 212 of FIG. 7, in accordance with one embodiment of the present invention; and FIG. 9 is a flowchart illustrating a method of receiving a hierarchically modulated signal from a transmitter system, in accordance with one embodiment of the present invention.

DETAILED DESCRIPTION OF THE INVENTION

Figure 1:
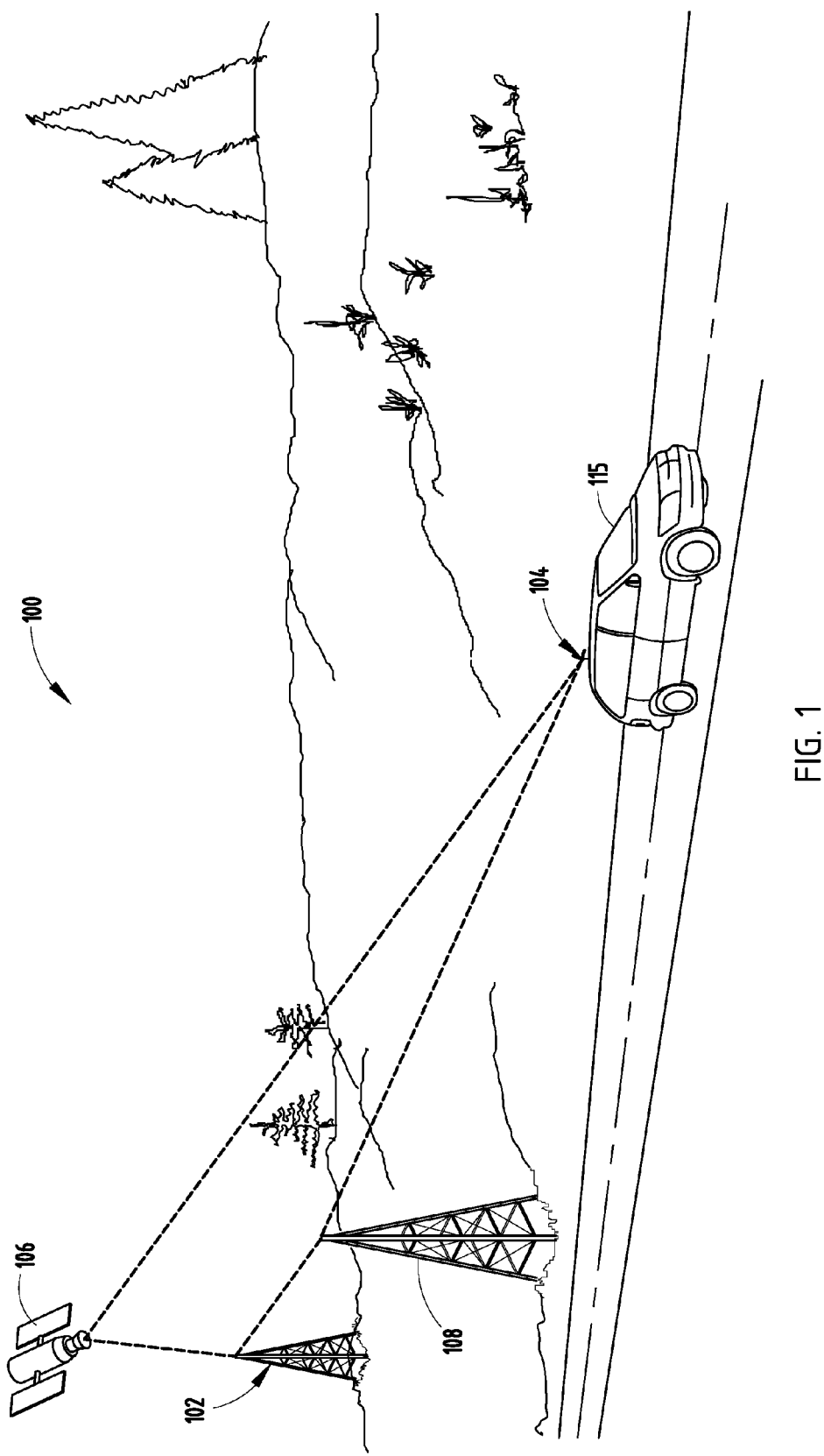
FIG. 1 is an environmental view of a communication system, in accordance with one embodiment of the present invention.
Figure 2:
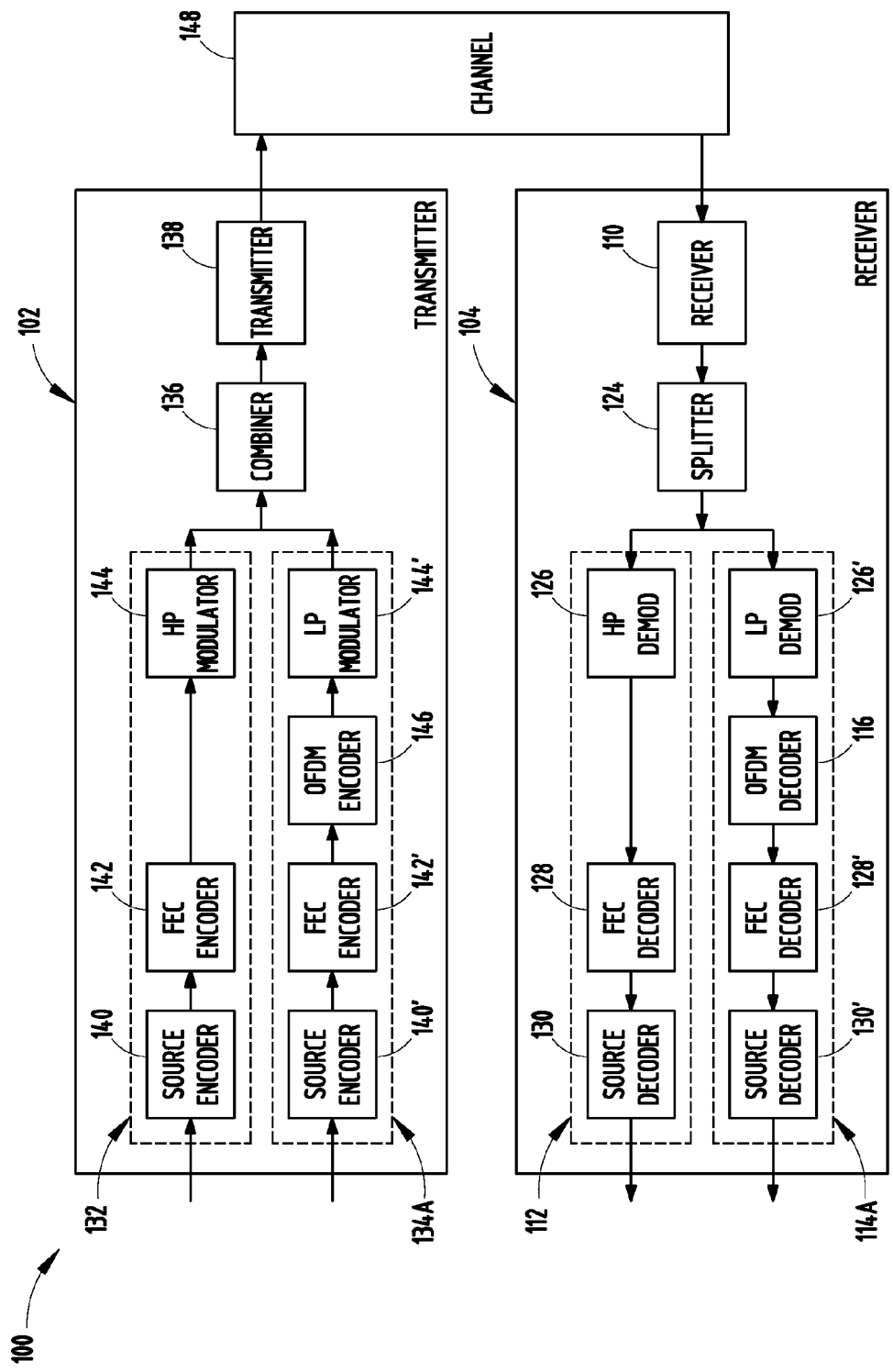
FIG. 2 is a block diagram of a communication system, in accordance with one embodiment of the present invention.
Figure 5:
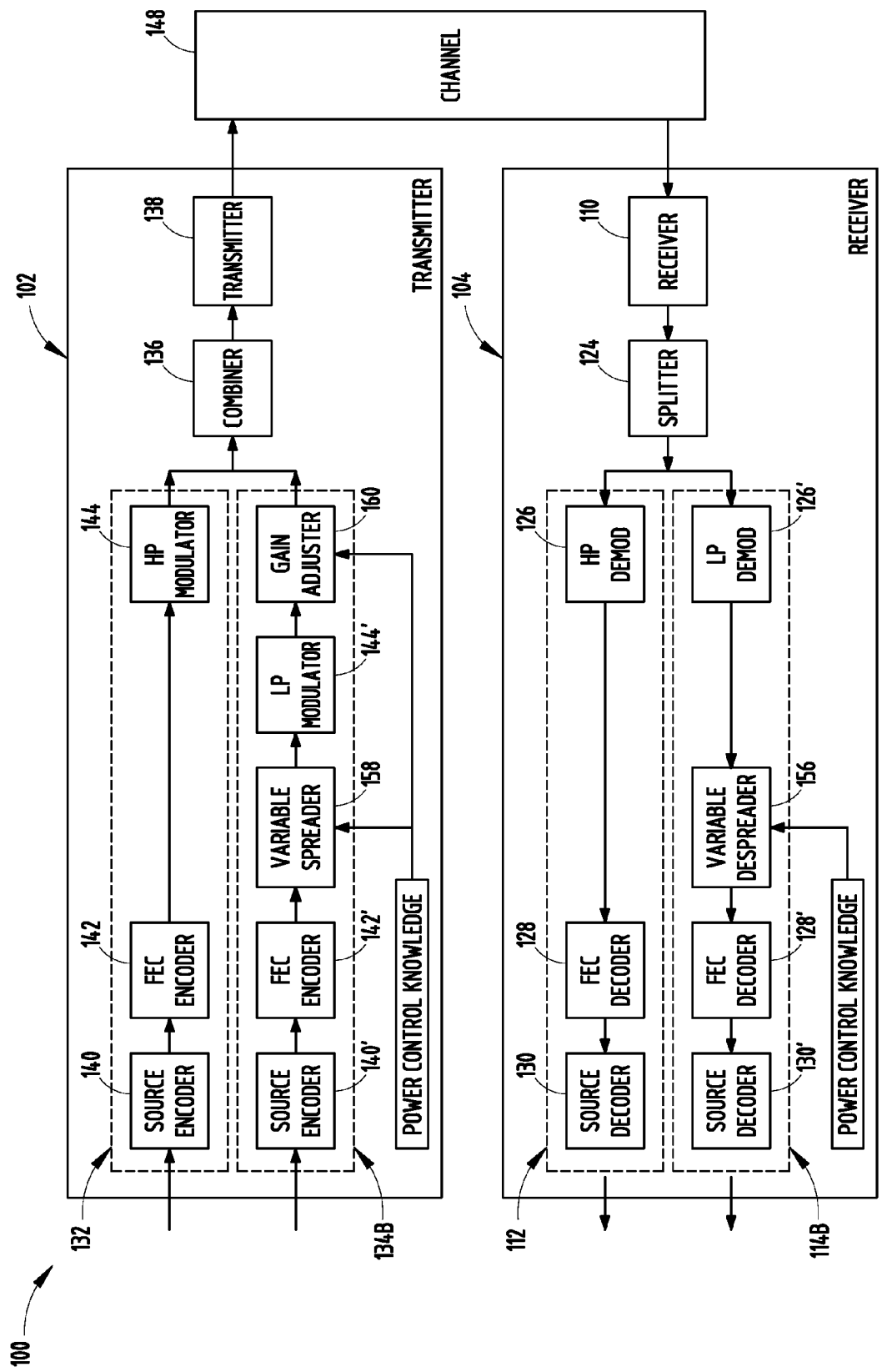
FIG. 5 is a block diagram of a communication system, in accordance with one embodiment of the present invention.

With respect to FIGS. 1, 2, and 5, a communication system is generally shown at reference identifier 100. The communication system 100 can include a transmitter system generally indicated at reference identifier 102, and a receiver system generally indicated at reference identifier 104, wherein the receiver system 104 is in communication with the transmitter system 102. According to one embodiment, the communication system 100 can include at least one satellite 106, at least one terrestrial repeater 108, or a combination thereof, which can be used to communicate (e.g., receive and re-transmit) a signal from the transmitter system 102 to the receiver system 104. Typically, the receiver system 104 can be a new or secondary receiver capable of receiving a hierarchically modulated signal transmitted from the transmitter system 102, wherein the communication system 100 can also include one or more legacy receivers, such that backwards compatibility for the legacy receivers can be maintained as a the function of the hierarchically modulated signal, as described in greater detail herein.

Exemplary communication systems are described in U.S. Pat. No. 7,657,225 entitled "METHOD TO MINIMIZE COMPATIBILITY ERROR IN HIERARCHICAL MODULATION USING VARIABLE PHASE," and U.S. Patent Application Publication No. 2007/0054614 entitled "METHOD TO MINIMIZE COMPATIBILITY ERROR IN HIERARCHICAL MODULATION USING VARIABLE PHASE," the entire disclosures of which are hereby being incorporated herein by reference.

The receiver system 104 can be configured to receive a hierarchically modulated signal from the transmitter system 102, according to one embodiment. The receiver system 104 can include a receiver device 110 configured to receive the hierarchically modulated signal, the hierarchically modulated signal being a function of a time domain, and including a high priority data stream that has a single carrier type modulation, and a low priority data stream, wherein data bits of the low priority data stream are spread over a plurality of data symbols of a high priority data modulation. The receiver system 104 can further include a high priority processor device generally indicated at reference identifier 112, which can be in communication with the receiver device 110, wherein the high priority processor device 112 can be configured to process the high priority data stream of the received hierarchically modulated signal, such that an output is emitted that is representative of the high priority data stream. Further, the receiver system 104 can include a low priority processor device generally indicated at reference identifier 114A that is in communication with the receiver device 110, wherein the low priority processor device 114A can be configured to process the low priority data stream of the received hierarchically modulated signal, and emit an output that is representative of the low priority data stream.

Typically, the output emitted from the high priority processor device 112 and the low priority processor device 114A is an audio output, a visual output, the like, or a combination thereof. According to one embodiment, the receiver system 104 can be at least partially integrated with a vehicle 115 (FIG. 1), such that the receiver system 104 is a mobile receiver system. However, it should be appreciated by those skilled in the art that the communication system 100 can include one or more receiver systems 104, which can be mobile receiver systems, stationary receiver systems, or a combination thereof.

According to one embodiment, the low priority processor device 114A can include an orthogonal frequency-division multiplexing (OFDM) decoder generally indicated at reference identifier 116, which can be in communication with the receiver device 110. The OFDM decoder 116 can be configured to convert the low priority data stream of the received hierarchically modulated signal as a function of the time domain to be a function of a frequency domain by utilizing a fast Fourier transform (FFT), such that an output can be emitted that is representative of the low priority data stream, as described in greater detail herein.

Figure 4:
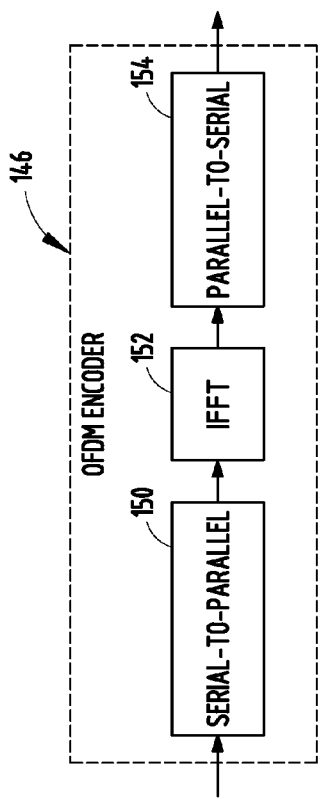
FIG. 4 is a block diagram of an OFDM decoder of FIG. 2, in accordance with one embodiment of the present invention.

With respect to FIG. 4, the OFDM decoder 116 can include a serial-to-parallel device 118 configured to receive an input into the OFDM decoder 116, according to one embodiment.

In such an embodiment, the OFDM decoder 116 can further include an FFT device 120 in communication with the serial-to-parallel device 118, wherein the FFT device 120 can be configured to convert the low priority data stream of the hierarchically modulated signal that is a function of the time domain to be a function of the frequency domain utilizing the FFT, and a parallel-to-serial device 122 in communication with the FFT device 120, wherein the parallel-to-serial device 122 is configured to emit an output from the OFDM decoder 116. It should be appreciated by those skilled in the art that additional or alternative suitable hardware components, software components, or a combination thereof, can be included in the OFDM decoder 116.

According to one embodiment, the received hierarchically modulated signal can have at least four (4) sub-carriers. Alternatively, the received hierarchically modulated signal can have at least eight (8) sub-carriers. However, it should be appreciated by those skilled in the art that other suitable numbers of sub-carriers can be utilized.

Additionally or alternatively, the low priority data stream can be encoded. By way of explanation and not limitation, encoding can include a phase, an amplitude, or a combination thereof of the quadrature phase-shift keying (QPSK) modulated signal being adjusted. In such an embodiment, the QPSK modulated signal can be adjusted on each carrier. Typically, the low priority data stream can be encoded by the transmitter system 102, as described in greater detail herein.

According to one embodiment, as illustrated in FIG. 2, the receiver system 104 can include a splitter device 124 in communication with the receiver device 110, wherein the splitter device 124 can be configured to split the hierarchically modulated signal so that the high priority data stream can be communicated to the high priority processor device 112, and the low priority data stream can be communicated to the low priority processor device 114A. It should be appreciated by those skilled in the art that additional or alternative suitable hardware components, software components, or a combination thereof, can be included in the receiver system 104.

The high priority processor device 112 can include a high priority demodulator 126, a forward error correction (FEC) decoder 128, and a source decoder 130. The low priority processor device 114A can include a low priority demodulator 126', an FEC decoder 128', and a source decoder 130'. However, it should be appreciated by those skilled in the art that additional or alternative suitable hardware components, software components, or a combination thereof, can be included in either or both of the high priority processor device 112 and the low priority processor device 114A.

The transmitter system 102 can include a high priority processor device 132, a low priority processor device 134A, a combiner 136 in communication with the high priority processor device 132 and the low priority processor device 134A, and a transmitter device 138 in communication with the combiner 136. The high priority processor device 132 can include a source encoder 140, an FEC encoder 142, and a high priority modulator 144, which can correspond to the source decoder 130, the FEC decoder 128, and the high priority demodulator 126, respectively. The low priority processor device 134A can include a source encoder 140', an FEC encoder 142', an OFDM encoder 146, and a low priority modulator 144', which can correspond to the source decoder 130', the FEC decoder 128', the OFDM decoder 116, and the low priority demodulator 126', respectively. A channel 148 can identify a communication path of the hierarchically modulated signal communicated from the transmitter system 102 to the receiver system 104. By way of explanation and not limitation, the channel 148 can be, but is not limited to, the satellite 106, the terrestrial repeater 108, the like, or a combination thereof.

Figure 3:
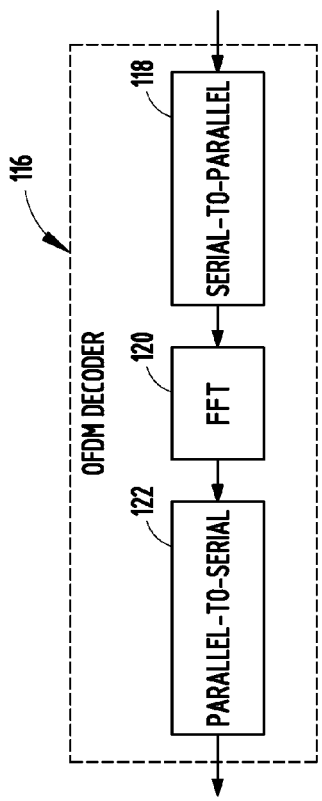
FIG. 3 is a block diagram of an OFDM encoder of FIG. 2, in accordance with one embodiment of the present invention.

In regards to FIGS. 2 and 3, the OFDM encoder 146 can include a serial-to-parallel device 150 configured to receive an input into the OFDM encoder 146, according to one embodiment. In such an embodiment, the OFDM encoder 146 can further include an inverse fast Fourier transform (IFFT) device 152 in communication with the serial-to-parallel device 150, wherein the IFFT device 152 can be configured to convert the low priority data stream of the hierarchically modulated signal that can be a function of the frequency domain to be a function of the time domain utilizing the IFFT, and a parallel-to-serial device 154 in communication with the IFFT device 152, wherein the parallel-to-serial device 154 can be configured to emit an output from the OFDM encoder 146. Typically, the serial-to-parallel device 150 and the parallel-to-serial device 154 of the OFDM encoder 146 can correspond to the serial-to-parallel device 118 and the parallel-to-serial device 122 of the OFDM decoder 116, respectively.

With respect to FIGS. 2-4 and 7, a method of receiving a hierarchically modulated signal is generally shown in FIG. 7 at reference identifier 200. The method 200 starts at step 202, and proceeds to step 204, wherein a hierarchically modulated signal can be received. Typically, the hierarchically modulated signal can be a function of a time domain, and can include a high priority data stream that has a single carrier type modulation, and a low priority data stream, wherein data bits of the low priority data stream can be spread over a plurality of data symbols of a high priority data modulation. At step 206, the hierarchically modulated signal can be split. Typically, the splitting of the received hierarchically modulated signal can be a function of the high priority data stream and the low priority data stream. At step 208, the high priority data stream can be processed, and at step 210, an output that is representative of can be processed high priority data stream can be emitted.

The method 200 can proceed from step 210, or from step 206, to step 212, such that steps 208 and 210 are performed substantially simultaneously as steps 212 and 214. At step 210, the split low priority data stream can be processed. Typically, the processing of the split low priority data stream includes converting the low priority data stream of the received hierarchically modulated signal as a function of the time domain to a frequency domain by utilizing the FFT. At step 214, an output that is representative of the processed low priority data stream can be emitted, and the method 200 then ends at step 216.

According to one embodiment, as illustrated in FIG. 8, step 212 of the method 200 can further include a plurality of steps. Step 212 can include serial-to-parallel converting at step 218, and FFT converting at step 220. Typically, the FFT converting can include converting the low priority data stream as a function of the time domain to a frequency domain utilizing the FFT. At step 222, the FFT can be parallel-to-serial converted.

According to an alternate embodiment, as illustrated in FIGS. 1 and 5, the receiver system 104 can be configured to receive a hierarchically modulated signal from the transmitter system 102. The receiver system 104 can include the receiver device 110 configured to receive the hierarchically modulated signal that can include a high priority data stream and a low priority data stream, and the high priority processor device 112 in communication with the receiver device 110, wherein the high priority processor device 112 can be configured to process the high priority data stream of the received hierarchically modulated signal, such that an output can be emitted that is representative of the high priority data stream.

The receiver system 104 can further include a low priority processor device 114B in communication with the receiver device 110, wherein the low priority processor device 114B can be configured to process the low priority data stream of the received hierarchically modulated signal, wherein the low priority processor device 114B can include a variable despreader device 156 in communication with the receiver device 110, wherein the variable despreader device 156 can be configured to reconstruct transmitted bits of the hierarchically modulated data stream by integrating received symbols over a variable integration time period corresponding to each of the bits, the variable integration time period being known by the transmitter system 102 and the low priority processor device 114B (e.g., as represented by "POWER CONTROL KNOWLEDGE" in FIG. 5), and each of the symbols having a corresponding variable integration time period, such that an output is emitted that is representative of the low priority data stream.

Figure 6:
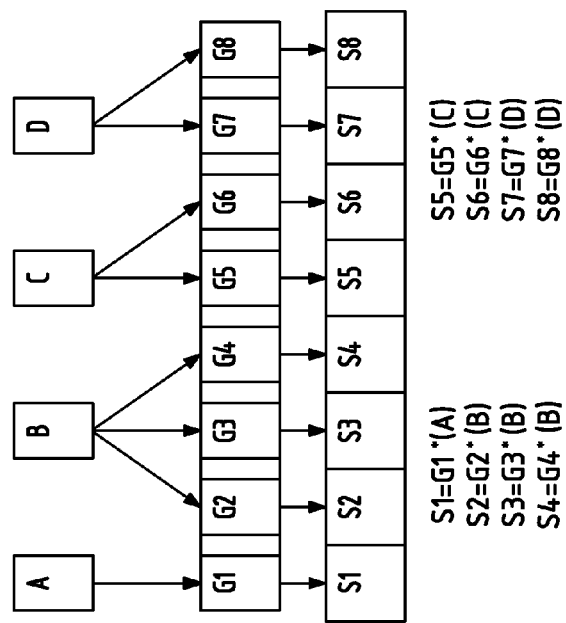
FIG. 6 is a diagram illustrating variable despreading, in accordance with one embodiment of the present invention.

With respect to FIGS. 1, 5, and 6, the variable despreadable device 156 can be further configured to spread energy from each of the transmitted bits, since energy for each of the transmitted bits is transmitted over varying time symbols. Additionally or alternatively, the variable despreader device 156 can be configured to reconstruct the transmitted bits when at least two of the transmitted bits are multiplied by a different spreading factor prior to transmission. Typically, the receiver system 104 can be configured to receive the transmitted bits that have substantially equal energy but have different noise power. According to one embodiment, the variable integration time period can be repeated over an integer number of low priority symbols, such that at least two variable integration time periods are utilized prior to one of the variable integration time periods being repeated.

The low priority processor device 114B can include, in addition to the variable despreader device 156, the low priority demodulator 126', the FEC decoder 128', and the source decoder 130'. The low priority processor device 134B can include the source encoder 140', the FEC encoder 142', a variable spreader 158, and a low priority modulator 144', which can correspond to the source decoder 130', the FEC decoder 128', the variable despreader 156, and the low priority demodulator 126', respectively. The low priority processor device 134B can also include a gain adjuster 160 in communication with the low priority modulator 144'. However, it should be appreciated by those skilled in the art that the low priority processor devices 114B, 134B can include additional or alternative hardware components, software components, or a combination thereof.

In regards to FIGS. 5 and 9, a method of receiving a hierarchically modulated signal from a transmitter system 102 is generally shown in FIG. 9 at reference identifier 300. The method 300 starts at step 302, and proceeds to step 304, wherein a hierarchically modulated signal is received. Typically, the hierarchically modulated signal includes a high priority data stream and a low priority data stream. At step 306, the hierarchically modulated signal can be split. Typically, the hierarchically modulated signal can be split as a function of the high priority data stream and the low priority data stream. At step 308, the split high priority data stream can be processed, and at step 310, an output that is representative of the processed high priority data stream can be emitted.

The method 300 can proceed from step 310 to step 312, or from step 306 to step 312, such that steps 312 and steps 314 are performed substantially simultaneously as steps 308 and 310. At step 312, the split low priority data stream is processed. Typically, the processing of the split low data stream 312 includes variably despreading to reconstruct transmitted bits of the received hierarchically modulated data stream by integrating received symbols over an integration time period corresponding to each of the transmitted bits, the variable integration time period being known by the transmitter system and a low priority processing device configured to process the split low priority data stream, and each of the symbols having a corresponding variable integration time period. At step 314, an output that is representative of the processed low priority data stream is emitted, and the method 300 then ends at step 316.

According to one embodiment, the step of processing the split low priority data stream 312 can include despreading energy from each of the transmitted bits, since energy from each of the transmitted bits can be transmitted over varying time symbols. Additionally or alternatively, the step of processing the split low priority data stream 312 can include reconstructing the transmitted bits when at least two of the transmitted bits are multiplied by a different spreading factor prior to transmission.

The step of receiving the hierarchically modulated signal 304 can include receiving the transmitted bits that have substantially equal energy, but have different noise power, according to one embodiment. Additionally or alternatively, the step of processing the variable integration time period can be repeated over an integer number of low priority symbols, such that at least two variable integration time periods are utilized prior to one of the variable integration time periods being repeated.

According to one embodiment, the communication system 100 can utilize QPSK modulation. In such QPSK modulation systems, a synchronous data stream can be modulated onto a carrier frequency before transmission over the satellite channel, and the carrier can have four (4) phase states, e.g., 45 degrees, 135 degrees, 225 degrees, or 315 degrees. Thus, similar to Quadrature Amplitude Modulation (QAM), QPSK employs quadrature modulation where the phasor points can be uniquely described using the I and Q axis. In contrast to QAM, however, the pair of coordinate axis in QPSK can be associated with a pair of quadrature carriers with a constant amplitude, thereby creating a four (4) level constellation, i.e., four (4) phasor points having a phase rotation of 90 degrees. Differential quadrature phase shift keying (D-QPSK) can refer to the procedure of generating the transmitted QPSK symbol by calculating the phase difference of the current and the preceding QPSK symbol, according to one embodiment. Therefore, a non-coherent detector can be used for D-QPSK because it does not require a reference in phase with the received carrier.

Hierarchical modulation, used in DVB-T systems as an alternative to conventional QPSK, 16-QAM and 64-QAM modulation methods, is possible. Each permissible digital state is represented by phasors in the I/Q plane. Since eight (8) by eight (8) different states can be defined, sixty-four (64) possible values of six (6) bits may be transmitted in 64-QAM constellation. In a 16-QAM constellation, there are four (4) by four (4) different states and four (4) transmitted bits, in a 4-PSK constellation, there are two (2) by two (2) states and two (2) transmitted bits, and in a BPSK constellation, there is one (1) state and one (1) transmitted bit.

In systems employing hierarchical modulation schemes, the possible states can be interpreted differently than in systems using conventional modulation techniques (e.g., QPSK, 16-QAM, and 64-QAM). By treating the location of a state within its quadrant and the number of the quadrant in which the state is located as a priori information, two separate data streams may be transmitted over a single transmission channel. While 64-QAM constellation is still being utilized to map the data to be transmitted, it may be interpreted as the combination of a 16-QAM and a 4-PSK modulation. 64-QAM constellation, upon which can be mapped data transmitted at six (6) bits/symbol, may be interpreted as including QPSK constellation 112 (which can include mapped data transmitted at two (2) bits/symbol) combined with 16-QAM constellation 114 (which can include mapped data transmitted at four (4) bits/symbol). The combined bit rates of QPSK and the 16-QAM data steams can be equal to the bit rate of the 64-QAM data stream.

In systems employing hierarchical modulation schemes, one (1) data stream can be used as a secondary data stream, while the other can be used as a primary data stream. The secondary data stream typically has a lower data rate than the primary stream. Using this hierarchical modulation scheme, the two (2) most significant bits may be used to transmit the secondary data to second generation receivers (e.g., the receiver system 104), while the remaining four (4) bits may be used to code the primary data for transmission to the legacy receivers.

According to one embodiment, a communication system configured to communicate a hierarchically modulated signal can include a transmitter system having an OFDM encoder configured to convert a low priority data stream of the hierarchically modulated signal that can be a function of a frequency domain to be a function of a time domain utilizing an IFFT. The communication system can further include a receiver system in communication with the transmitter system, wherein the receiver system can include an OFDM decoder configured to convert a low priority data stream of the received hierarchically modulated signal that can be a function of the time domain to be a function of a frequency domain by utilizing the FFT, such that an output is emitted that is representative of the low priority data stream. Such a communication system can further include other components explicitly or inherently described herein, other suitable components, or a combination thereof.

According to one embodiment, a communication system configured to communicate a hierarchically modulated signal can include a transmitter system having a variable spreader configured to construct data bits by multiplying them by different spreading factors. The communication system can also include a receiver system that includes a variable despreader configured to reconstruct the transmitted bits of the hierarchically modulated data stream by integrated received symbols over a variable integration time period corresponding to each of the transmitted bits, the variable integration time period being known by the transmitter system and a low priority processor device, and each symbol having a corresponding integration time period, such that an output is emitted that is representative of the low priority data stream. Such a communication system can further include other components explicitly or inherently described herein, other suitable components, or a combination thereof.

Advantageously, the communication system 100 and methods 200, 300 can communicate a hierarchically modulated signal that includes high priority data and low priority data, which can be received and processed to emit an output by a second generation receiver while maintaining backwards compatibility with legacy receivers. Thus, the low priority data stream of the hierarchically modulated signal appears as noise to the legacy receiver, while being processed to emit additional outputs by the receiver system 104. It should be appreciated by those skilled in the art that additional or alternative advantages may be present from the communication system 100 and methods 200, 300. It should further be appreciated by those skilled in the art that the above described elements can be combined in additional or alternative manners that may not be explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. A receiver system configured to receive a hierarchically modulated signal from a transmitter system, said receiver system comprising:
   a receiver device configured to receive the hierarchically modulated signal, the hierarchically modulated signal being a function of a time domain, and comprising a high priority data stream that has a single carrier type modulation, and a low priority data stream having data bits, wherein the data bits of said low priority data stream are spread over a plurality of data symbols of a high priority data modulation;
   a high priority processor device in communication with said receiver device, wherein said high priority processor device is configured to process said high priority data stream of said received hierarchically modulated signal, such that an output is emitted that is representative of said high priority data stream;
   a low priority processor device in communication with said receiver device, wherein said low priority processor device is configured to process said low priority data stream of said received hierarchically modulated signal, said low priority processor device comprising:
   an orthogonal frequency-division multiplexing (OFDM) decoder in communication with said receiver device, wherein said OFDM decoder is configured to convert said low priority data stream of said received hierarchically modulated signal that is a function of said time domain to be a function of a frequency domain by utilizing a fast Fourier transform (FFT), such that an output is emitted that is representative of said low priority data stream;
   a serial-to-parallel device configured to receive an input into said OFDM decoder;
   a FFT device in communication with said serial-to-parallel device, wherein said FFT device is configured to convert said low priority data stream of the hierarchically modulated signal that is a function of said time domain to be a function of said frequency domain utilizing said FFT; and
   a parallel-to-serial device in communication with said FFT device, wherein said parallel-to-serial device is configured to emit an output from said OFDM decoder.

2. The receiver system of claim 1, wherein said received hierarchically modulated signal has at least four (4) sub-carriers.

3. The receiver system of claim 1, wherein said high priority data stream is quadrature phase-shift keying (QPSK) modulated.

4. The receiver system of claim 3, wherein said low priority data stream is encoded, such that at least one of a phase and an amplitude of said QPSK modulated signal is adjusted.

5. A method of receiving a hierarchically modulated signal, said method comprising the steps of:
   receiving the hierarchically modulated signal, the hierarchically modulated signal being a function of a time domain, and comprising a high priority data stream that has a single carrier type modulation, and a low priority data stream having data bits, wherein the data bits of said low priority data stream are spread over a plurality of data symbols of a high priority data modulation;

splitting said received hierarchically modulated signal as a function of said high priority data stream and said low priority data stream;

processing said split high priority data stream;

emitting an output that is representative of said processed high priority data stream;

processing said split low priority data stream, which comprises serial-to-parallel converting said split low priority data stream, utilizing a fast Fourier transform (FFT) for converting said serial-to-parallel converted low priority data stream that is a function of said time domain to be a function of said frequency domain utilizing said FFT, and parallel-to-serial converting said FFT, thereby converting said low priority data stream of said received hierarchically modulated signal that is a function of said time domain to be a function of a frequency domain; and emitting an output that is representative of said processed low priority data stream.

6. The method of claim 5, wherein said received hierarchically modulated signal has at least four (4) sub-carriers.

7. The method of claim 5, wherein said high priority data stream is quadrature phase-shift keying (QPSK) modulated.

8. The method of claim 5, wherein said low priority data stream is encoded, such that at least one of a phase and an amplitude of said QPSK modulated signal is adjusted.

* * * * *